April 2, 1974 N. T. CASTELLUCCI ET AL 3,801,474
PROCESS AND APPARATUS FOR SOLAR DISTILLATION UTILIZING
CELLULAR CERAMIC NODULES TO IMPROVE THE
EVAPORATION RATE
Original Filed June 2, 1969
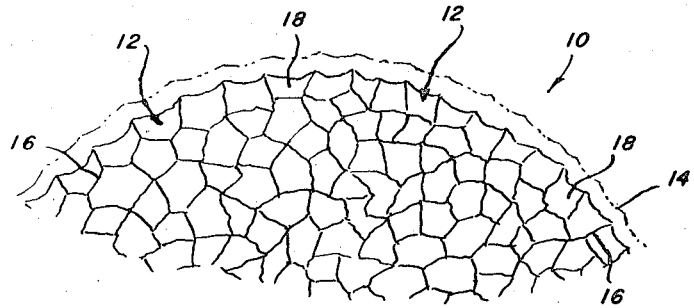
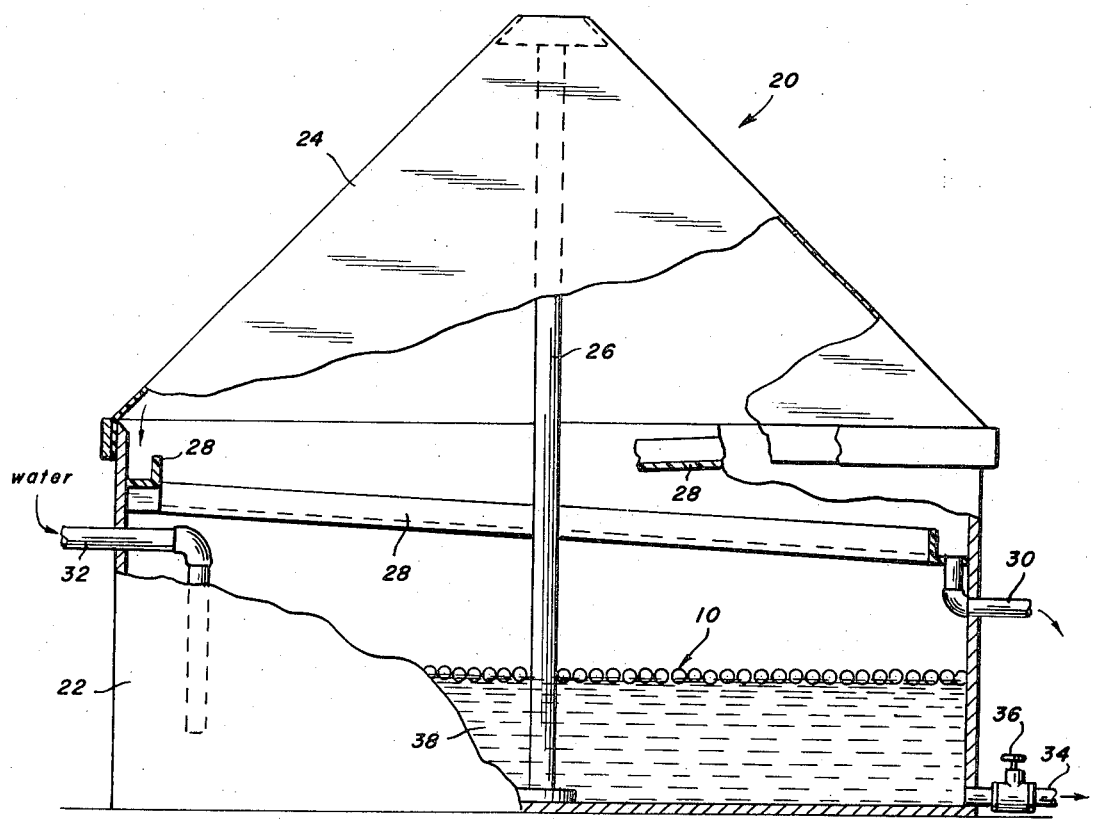
INVENTORS
NICHOLAS T. CASTELLUCCI and
NED C. KROUSKOP
By Stanley J. Price
their Attorney United States Patent Office 3,801,474
Patented Apr. 2, 1974

3,801,474
PROCESS AND APPARATUS FOR SOLAR DISTILLATION UTILIZING CELLULAR CERAMIC NODULES TO IMPROVE THE EVAPORATION RATE
Nicholas T. Castellucci and Ned C. Krouskop, Pittsburgh, Pa., assignors to Pittsburgh Corning Corporation, Pittsburgh, Pa.
Continuation of abandoned application Ser. No. 829,375, June 2, 1969. This application Sept. 10, 1971, Ser. No. 179,305
Int. Cl. B01d 1/22
U.S. Cl. 203—10        10 Claims

ABSTRACT OF THE DISCLOSURE

This disclosure relates to a process for recovering fresh water from brine or salt water by solar distillation. An inventory of substantially spherical cellular ceramic nodules having an outer textured surface is positioned on the upper surface of a body of sea water within a container. The nodules float on the upper surface of the salt water in a partially submerged condition with the upper exposed surfaces of the nodules above the surface of the water. The upper surfaces of the nodules are wetted by the water and a relatively thin film is formed thereon. The film on the upper surface of the nodules is subjected to elevated temperatures by solar radiation and the water in the thin film evaporates and is continually replaced as a thin film from the body of water. The water vapor condenses on a covering surface over the container and is suitably collected.

CROSS-REFERENCES TO RELATED APPLICATIONS

This application is a continuation of a copending patent application entitled, "A Process and Apparatus for Solar Distillation Utilizing Cellular Ceramic Nodules to Improve the Evaporation Rate," Ser. No. 829,375, filed June 2, 1969, and now abandoned.

A copending application entitled, "Tower Packing Elements," Ser. No. 727,242, filed May 7, 1968, and issued Feb. 3, 1970 as U.S. Pat. No. 3,493,218, discloses cellular ceramic nodules with an external surface having a plurality of cup shaped recess portions.

BACKGROUND OF THE INVENTION (1) Field of the invention

This invention relates to a process and apparatus for distillation and more particularly to a process and apparatus for the evaporation and distillation of liquids by the application of radiant energy in a solar still or similar device.

(2) Description of the prior art

In the prior art, many methods and types of apparatus have been proposed for large scale and inexpensive distillation of sea water, brine and other liquids by the application of radiant energy in solar stills and other various means adapted to enhance the rate of evaporation of the liquid to be distilled. Generally, the prior art devices comprise a receptacle to contain, or an enclosing means to surround, a quantity of the liquid to be distilled. Ordinarily, a transparent or translucent material provides covering means which is suspended over the liquid to be distilled and slopes downwardly toward the sides of the receptacle or enclosing means. The covering means is adapted to permit the passage of solar energy or other radiant energy into the receptacle or other enclosing means to raise the temperature of the brine or other liquid to be distilled and vaporize that liquid.

Many means have been suggested for enhancing evaporation of the liquid to be distilled in the still apparatus. For example, U.S. Pat. 3,428,529 discloses a solar still and method for distillation in which the liquid to be distilled is mixed with a foaming agent and agitated by streams of gas in the bottom of the still, thereby creating a foam presenting a greater liquid surface area for evaporation. That method has at least two disadvantages in that it requires a supply of gas for agitation and in that the gas itself creates a phase in the system which removes heat from the system.

U.S. Pat. 3,351,538 discloses an evaporation enhancing agent consisting of black porous fabric or felt, and dark porous absorbant materials such as peat moss, charcoal, balsa or other wood, sawdust, brick lava, pumice, silica gel, sandstone, porous limestone, and other materials which have the disadvantage of absorbing heat from the system and promoting growth on the materials of bacteria, fungi, and precipitates from the liquid to be distilled. Such materials must be frequently cleaned and replaced. In addition, that reference emphasizes that efficient operation of such devices requires great caution in order that the evaporation enhancing agent is not flooded by, or caused to float in, the liquid to be distilled.

U.S. Pat. 3,279,527 describes the use of particulate carbonaceous materials, or hydrophilic materials which are treated with surface active agents to render them hydrophobic. U.S. Pat. No. 3,282,327 discloses the use of a coating deposited over the surface of the water and consisting of a polymer associated with finely divided carbonaceous materials, which are preferably porous and permeable. The evaporation enhancement agents named in those two patents likewise absorb heat from the system and permit the growth and accumulation of bacteria, fungi and precipitates.

Additional references showing other elements of structure of a typical colar still are U.S. Pats. 3,337,418 and 1,812,516.

SUMMARY OF THE INVENTION

According to the process of this invention, brine or other evaporation liquid is distilled by separating a relatively thin film of that liquid from a body of such liquid, subjecting the thin film to elevated temperatures to vaporize liquid from the thin film. The liquid in the thin film is continuously replaced from the body of liquid and the vaporized liquid is condensed and collected.

In a preferred embodiment of the process herein described, a plurality of inventory of cellular ceramic nodules having an outer textured surface is deposited on the free surface of the brine or other evaporation liquid to be distilled so that the nodules float thereon. The nodules are wetted by the brine or other evaporation liquid and float on the upper surface of the liquid in a partially submerged condition with the upper exposed surfaces of the nodules above the surface of the liquid. On the upper exposed surfaces of the nodules a relatively thin film of liquid is formed which is isolated thermally from the heat sink and subjected to elevated temperatures. The liquid in the film is thus vaporized. The thin film of liquid on the upper exposed surfaces of the nodules is continuously replenished and replaced by liquid migrating from the surface of the liquid on which the nodules float. Thereafter, the vaporized liquid is condensed and suitably collected. Apparatus suitable for use with the process of this invention comprises a solar still or the like containing brine or other evaporation liquid within an enclosing means under a covering means that is adapted to permit the passage of solar or other radiant energy into the enclosing means. A collecting means is provided to suitably collect the condensate formed. A material element of the apparatus is an inventory of substantially spherical cellular ceramic nodules having a textured outer surface and floated on the free surface of the evaporation liquid.

It is an object of this invention to provide a process and apparatus for liquid distillation with a high degree of thermal efficiency.

It is a further object of this invention to provide a process and apparatus for liquid evaporation which can be applied inexpensively on a large scale for indefinitely long periods of time.

These and other objects and advantages of this invention will be more completely disclosed and described in the following specification, the accompanying drawings and the appended claims.

DESCRIPTION OF THE DRAWINGS

FIG. 1 illustrates a fragmentary portion of a cellular glass nodule having an outer textured surface.

FIG. 2 is a semidiagrammatic representation of the solar still apparatus of this invention.

DESCRIPTION OF THE PREFERRED EMBODIMENTS

The method and apparatus of this invention can be explained comprehensively and explicitly by first establishing the definitions of certain terms used herein as follows:

Enclosing means connotes any means employed to confine a body of evaporation liquid, such as the liquid receptacles of conventional solar stills and the cylindrical tubes and other means employed to confine liquid on an open body of water.

Covering means connotes any type of transparent or translucent cover adapted to permit the passage therethrough of solar radiation and other forms of radiant heat or other radiant energy.

Radiant energy connotes solar heat, other forms of radiant heat, and forms of radiant energy such as ultra violet and infrared radiation and the like.

Collecting means connotes any device or apparatus employed to accumulate, transport, conduct and confine liquids such as the transparent or translucent sheets of covering material used conventionally in prior art apparatus, and the systems of ducts, pipes, conduits, and receptacles conventionally employed in solar stills and the like.

Evaporation liquid connotes a liquid to be vaporized and distilled.

Liquid condensate connotes the material obtained by condensation of the vapors generated by subjecting an evaporation liquid to elevated temperatures.

Precipitates or residue materials or solids connotes materials precipitated or accumulated from an evaporation liquid on the surfaces of the cellular ceramic nodules and on other surfaces of the apparatus.

Irregular textured surface is intended to define the abraded surface of the cellular ceramic nodules that includes a plurality of cup like depressions or recesses formed by the remaining portion of the cells on the surface of the nodules.

Substantially spherical shape connotes the outer massive shape of the body of a cellular ceramic nodule, which shape can be defined by a closed surface tangent to substantially all the cusps formed by the intersection of the inner surfaces of contiguous concave cells comprising the continuous outer surface of the nodule.

Wicking action connotes the means by which a liquid is attracted and drawn onto the exposed surfaces of the nodules by capillary forces or surface tension forces and the like.

Referring to FIGS. 1 and 2 the cellular glass nodule 10 has a generally spherical shape with recessed portions 12 in the outer surface formed by removing the outer surface of the cell that is indicated by the dash-dot line. The layer of individual completely closed cells beneath the skin 14 are partially removed from the external surface of the cellular glass nodule 10. Portions of the cell walls 16 of the individual cells 12 have been removed by a milling process so that recessed micro-cup portions 18 in the layer of cells beneath the removed outer skin 14 are formed. It should be understood, although reference is made to the layer of cells 12 immediately beneath the outer skin 14, that the cellular glass nodule 10 with the textured outer surface can be attained by removing several layers of cells with the outer skin 14.

Referring to FIG. 2, the solar still is generally designated by the numeral 20 and includes a container 22 that may be rectangular in configuration and is capable of confining the evaporation liquid therein. A covering means 24 is positioned over the container 22 and may be fabricated from transparent plastic material such as polyethylene film. A suitable support 26 maintains the configuration of the covering 24 illustrated in FIG. 2. A trough 28, preferably inclined, is connected to the covering 24 and is arranged to collect the vapor that condenses and flows down the inclined portions of the cover 24. The condensed vapors or distillate is collected through the outlet 30 in a suitable collecting means. A suitable supply conduit 32 may be provided to replace the liquid evaporated in the still 20. There is also provided an outlet 34 adjacent the base of the container 22 that includes a valve member 36. Where the salt concentration of the liquid exceeds a desired level, the liquid within the container 22 may be removed therefrom through outlet 34 and replaced with other liquid. In FIG. 2 an inventory of liquid is provided in the container 22. A monolayer of cellular ceramic nodules 10 is floated on the upper surface of the liquid 38 to enhance and increase the evaporation efficiency, as later described.

The cellular ceramic nodules suitable for use in this process may be prepared in accordance with the process described in U.S. Pat. No. 3,354,024 from a pulverulent glassy material and a cellulating agent or from other pulverulent materials and a cellulating agent in accordance with the process described in U.S. Pat No. 3,341,396. A description of the process for providing a textured surface on the nodule may be found in copending application Ser. No. 727,242, filed May 7, 1968, and now U.S. Pat. No. 3,493,218, and entitled, "Tower Packing Element." The cellular ceramic nodules enable and enhance evaporation of the liquid through interaction of the physical characteristics of the nodules, such as the surface morphology, the density, the impermeability, the chemical composition, the thermal characteristics, and the like. The nodules may have an apparent density of between about 6 and 30 pounds per cubic foot and a thermal conductivity of between about 0.40 and 0.50 B.t.u./hr./sq. ft./ ° F./in. or less at 75° F. The nodules can be made in many different sizes. Nodules of a size between ⅛ and ½ inch with an apparent density of between 10 and 20 pounds per cubic foot were found suitable.

The cellular ceramic nodules used in the method of this invention are described more fully in U.S. Pats. No. 3,354,024 and No. 3,441,396 and in application for U.S. Letters Patent, Ser. No. 727,242, now U.S. Pat. No. 3,493,-218. Those nodules are made by admixing relatively fine pulverulent glass particles or other pulverulent ceramic materials as described in U.S. Pat. No. 3,441,396, with a cellulating agent such as carbon black or the like. A binder is then added to the mixture which is then pelletized and subsequently coated with a parting agent. The coated pellets are dried and heated in a rotary furnace or kiln to a cellulating temperature to bloat or cellulate the pellets. During the cellulation process, the parting agent serves to prevent contiguous or adjacent nodules from adhering to each other.

The cellular ceramic nodules thus produced have a core of individual, completely closed cells of glassy material and a continuous outer skin of a glassy material. For use in this process, the cellular ceramic nodules produced as described above are abraded or otherwise treated to remove a relatively thin, continuous outer skin of glassy material and a portion of the layer of cells therebeneath to expose, over the entire outer surface of the nodule, a plurality of contiguous individual cup-like depressions or concave cells. For brevity and simplicity, the plurality of contiguous, concave, cup-shaped depressions comprising the entire outer surface of the abraded nodules, will be referred to hereinafter as an irregular textured outer surface.

The method of this invention comprises establishing, above the body of evaporation liquid, a restricted and insulated evaporation zone wherein evaporation is enhanced by the efficient and optimum utilization of heat and other radiant energy in the evaporation process. The enhanced evaporation zone is established by maintaining, above the body of evaporation liquid, a thin film of evaporation liquid that is spaced from, and thermally insulated from, the large mass of evaporation liquid while maintaining fluid communication between the thin film and the body of evaporation liquid.

In performing the process of this invention, the evaporation liquid is confined in a suitable enclosing means provided with collecting means as described above. Then an inventory or plurality of cellular ceramic nodules are randomly added to the free surface of the body of evaporation liquid to preferably cover the free surface with a monolayer of cellular ceramic nodules. The cellular ceramic nodules produced as described above exhibit many characteristics which inherently interact with the evaporation liquid to establish an enhanced evaporative distillation process and those nodule characteristics are readily and preferentially adaptable to function with the method and apparatus of this invention. For example, the cellular ceramic nodules function as a highly efficient evaporation enhancing agent because the nodules are impervious and impermeable to the flow of fluids into and through the nodules. Therefore all of the evaporation liquid that is drawn into the thin film of liquid on the nodules by the wicking action, the capillary forces and the attractive surface forces is maintained in the highly thermally efficient evaporation zone established on the exposed upper surfaces of the nodules above and remote from the body of evaporation liquid.

The nodules adapted to use in the novel apparatus and method of this invention preferably have a density substantially less than the density of the evaporation liquid. It is preferred that the nodules have a density selected and adapted to provide for flotation of the nodules on the free surface of the evaporation liquid, with only a portion of the nodules submerged below the surface of the evaporation liquid. Nodules produced as described above generally have a density of about 6 pounds per cubic foot to about 30 pounds per cublic foot. Nodules having a density within that range have exhibited a high degree of efficiency when used with the method and apparatus of this invention.

Another preferred characteristic of the evaporation enhancing agent or nodule adapted for use in this invention is that the nodule have a chemical composition that is inert and unreactive with the evaporation liquid and with the atmosphere within the evaporative distillation apparatus. Provision of a nodule that is chemically inert with respect to the materials which it will contact during use of this invention assures that the surface morphology of the nodule will not be substantially altered during use and that the density and other desirable characteristics of the nodule and of the evaporation liquid, will not be detrimentally altered during the process of this invention.

Another advantage inherent in the use of the nodules of this invention is that cellular ceramic nodules produced as described above and used in this invention are not degradated or degenerated by the free radical reactions which are initiated by ultraviolet or infrared radiation in many plastic materials and the like.

The use in this invention of a cellular ceramic nodule having the combined properties of impermeability, chemical inertness, and a substantially low density relative to the density of the evaporation liquid provides a unique and novel material advantage inherent in this invention. Because of the chemical inertness and impermeability of the nodules, the internal structure and composition of the nodules remain unchanged throughout the process. Therefore, the location of the center of gravity within each nodule, as a separate discrete body or mass, remains unaltered. In addition, when the difference in densities between the nodule and the evaporation liquid is substantial, the nodules float in the evaporation liquid with the major portion of the mass of the nodule extending above the free surface of the evaporation liquid and with the center of gravity of each nodule supported a relatively substantial distance above the free surface of the evaporation liquid.

During the course of the evaporative distillation, the growth and accumulation on the exposed upper surfaces of the nodules of bacteria, fungi, and precipitates is diminished and retarded by the chemically inert composition of the nodule. If the growth and accumulation of such materials on the surface of the nodules does occur, that accumulation disturbs the balance of the individual nodule in the surface of the evaporation liquid and causes the nodule to rotate therein, thereby immersing the deposit or accumulation in the evaporation liquid, dissolving the deposited material, and cleaning the freshly submerged surface of the nodule. Because of the autonomous and continual surface cleansing action by the nodules, periodic repeated replacement or cleaning of the nodules is not required. Therefore, the method and apparatus of this invention can operate without interruption for indefinitely long periods of time on a large scale at substantially reduced operation and maintenance costs.

Although, as will be explained more fully below, it is preferred that the outer surface of the cellular ceramic nodule of this invention consist of a continuum of contiguous, concave cells, providing an irregular textured outer surface, it is also preferred that the overall shape of the cellular ceramic nodule be substantially spherical. In other words, it is preferred that the nodule be so shaped that a closed three dimensional surface surrounding the nodule and tangent to each cusp formed by the mutual convergence of the walls of contiguous cells, forms a substantially spherical surface.

As will be explained more fully below, in most applications of this invention, a substantially spherical shape provides greater efficiency and is highly preferred; however, the method and apparatus of this invention can work completely and effectively even with an inventory of nodules, some or all of which, exhibit a substantial degree of non-sphericity.

The preferred size of the cellular ceramic nodules used with this invention is a function of several parameters, among which are the nature and composition of the evaporation liquid; the specific composition and unique morphology of the type of cellular ceramic nodule employed; the dimensions and other structural characteristics of the evaporative distillation apparatus employed; the ambient temperature and other ambient physical conditions around the system comprising the evaporation apparatus; and the temperature and other physical and chemical characteristics internal to the system. Probably one large nodule would not function as efficiently as a plurality of smaller nodules because of the operative effect in this invention of such factors as nodule surface area, nodule surface morphology, wicking action or surface capillary force, surface tension and other attractive surface forces. In tests of the evaporative distillation of a 3.5 percent saline solution using the nodules of this invention, it was found that satisfactory results offering substantial improvement in efficiency over other conventional materials was obtained with cellular ceramic nodules having a diameter of from about ¼ inch to about ¾ inch. In similar tests, it was found that greater efficiency in operation and a higher rate of evaporation were obtained using nodules having a diameter of from about ¼ to ¾ inch. Selection of the optimum size nodule to be used in this invention in the evaporative distillation of a specific liquid in a particular type of apparatus can be determined as a function of the characteristics of the liquid and apparatus from empirical analysis and from consideration of the effects of the various parameters discussed herein.

The operation and efficiency of the method and apparatus of this invention are substantially enhanced if the nodules function in the physical system as a thermal insulator relative to the evaporation liquid. Therefore, the nodules used should preferably have a thermal conductivity substantially lower than the thermal conductivity of the evaporation liquid. With brine and similar evaporation liquids, nodules produced as described above and having a thermal conductivity, at 75° F., of approximately 0.40 to 0.50 B.t.u./hr./sq. ft./° F./min. function well in the method of this invention providing substantially enhanced rates of evaporation with increased thermal efficiency.

From the foregoing it is seen that each nodule functions as a thermally insulating support member for the thin film of liquid on the surface of that nodule to separate that thin film, and the heat concentrated therein, from the relatively enormous mass of the body of evaporation liquid. Therefore, the nodules assist the accumulation of heat and energy in a thin body of liquid while preventing the transfer of heat from that thin body of liquid to the relatively great mass of cool liquid in the body of evaporation liquid, thereby substantially inhibiting the dissipation of heat and thereby optimizing the energy consumption.

Another preferred characteristic of the cellular ceramic nodules employed with the method and apparatus of this invention is that those nodules have the unique surface morphology exhibited by nodules produced in the manner described above. As was explained above, it is desirable that the overall shape of the nodules be substantially spherical; however, it is also desirable that the nodule have an outer surface comprised of a continuum of contiguous concave cells providing an irregular textured outer surface. Among the functional advantages provided by the preferred surface morphology of the nodules of this invention are an increase in thermal efficiency; an enhancement of attractive surface forces and the provision of greater available surface area available for the evaporation zone.

The thermal operation of a physical system containing the nodules of this invention is enhanced in the following way. Nodules produced as described above are dark in color and therefore have substantially diminished ability to reflect radiant energy impinging upon the surfaces of those nodules. In addition, each of the concave cells on the surface of the nodule is roughly hemispherical in shape and thereby functions not only as a miniscule receptacle for a minute reservoir of evaporation liquid, but also directs what little energy is reflected, not out of the thin film of evaporation liquid, but rather laterally back and forth between cells and within cells but generally within the thin film of evaporation liquid to be vaporized.

In tests run using the nodules of this invention the surface temperature of the nodules was 20 to 30° F. higher than the temperature of the body of evaporation liquid and approximately 10° F. higher than the temperature of the atmosphere in the still apparatus.

It clan be demonstrated that, for two spheres of equal diameter, the external surface area of a sphere having the irregular textured outer surface of the nodules of this invention, is approximately twice the external surface area for a sphere having a smooth outer surface. Thus, the nodules of this invention provide greater surface area available for the establishment of a thin film of evaporation liquid to establish an enhanced evaporation zone which is greater than the available area that would be provided by smooth spheres or other similar geometric shapes having smooth outer surfaces.

It is noted also that the irregular textured outer surface of the nodules of this invention is substantially more effective than conventional materials in enhancing the effects of surface tension and capillary forces and wicking action in creating and maintaining a thin film of evaporation liquid in the evaporation zone. The myriad miniscule cup-like cells each contain a minute reservoir of evaporation liquid which facilitates the spreading and maintenance of a thin film substantially continuously over the entire exposed surface of the nodule.

Although it is not definitely known how the method and apparatus of this invention function in providing an improved and enhanced evaporative distillation process, consideration of the empirical observations and test results presented in this specification can support the hypothesis presented below concerning the manner in which this method functions. However, it should be noted that there is intended by the explanation herein no representation that the hypothesis of functionality presented is either accurate or complete, and there is no intention to restrict or limit in any way the scope of this invention, or the protection afforded thereto by the appended claims.

It would appear that the substantial improvement in efficiency and operation afforded by the evaporative distillation process and apparatus of this invention arises partly from the provision of a thin and restricted body of evaporation liquid in an evaporation zone in which substantially all of the radiation energy available is concentrated and maintained for its efficient use in vaporization of the thin liquid film. The inventory or plurality of thermally nonconductive cellular ceramic nodules prevents substantially the dissipation of heat into the mass of the body of evaporation liquid where such heat would be wasted, as in conventional methods and apparatus.

It also appears that the thin film of evaporation liquid is lifted or raised into the evaporation zone remote from the body of evaporation liquid by possibly two or three separate physical mechanisms. First, there is a spreading of the evaporation liquid over the exposed surfaces of nodules above the body of evaporation liquid owing to attractive interfacial and surface tension forces arising probably from cohesion between the molecules of the evaporation liquid and the molecules of the nodule. Total and more effective spreading and covering of the entire nodule surface is facilitated by the plurality of minute reservoirs of liquid provided by the plurality of surface cells on the nodules.

Secondly, the evaporation liquid is raised above the free surface of the body of that liquid and is channeled around adjacent and contiguous nodules by capillary forces arising from the interaction of the cohesive attraction between liquid molecules and nodule molecules and the adhesive attraction among similar liquid molecules in a continuum of the liquid.

Thirdly, the wicking action, often used as a term of art in the prior art, appears to be an expression of the gross effect of both surface attractive forces and capillarity in causing both the separation from the body of evaporation liquid and the spreading of thin films of evaporation liquid.

Another advantage inherent in the use of the method and apparatus of this invention arises from the fact that the advantageous physical and chemical characteristics of the cellular ceramic nodules provide continuous replenishment in the evaporation zone of the evaporation liquid to be vaporized. Fluid communication is maintained between the body of evaporation liquid and the thin film to assure a constant supply of evaporation liquid to the evaporation zone.

The quantity of cellular ceramic nodules placed on the surface of the evaporation liquid in any particular application of this invention is determined by many factors such as the nature of the evaporation liquid, the chemical and physical characteristics of the nodules, the nature and source of the radiant energy employed, and the magnitude of the temperature increase to which the evaporation liquid is subjected in the evaporation zone. It has been found advantageous, and even preferable, to position on the surface of the body of evaporation liquid a substantially continuous monolayer of nodules or, in certain instances, a discontinuous or partial monolayer of nodules. The use of a partial monolayer, a monolayer, or multiple layers of nodules will generally be determined by the optimum between the greatest enhancement of the surface tension forces, the capillary forces and the wicking action, and the thermal insulation of the thin liquid film in the evaporation zone from the body of evaporation liquid.

The following examples are merely illustrative and not intended to limit this invention.

EXAMPLES

In a number of comparative distillations there were employed two solar stills with identical geometry and dimensions and having structural features known and conventional in the prior art except for the use and substitution of various types of evaporation enhancing agents. Each still was filled with 2,600 liters of a 3.5 percent saline solution. After establishment of thermal equilibrium, the amount of distillate from each still under contemporaneous and identical conditions, was measured. Table I below shows the results obtained in simultaneous distillations in both stills, neither containing any evaporation enhancing agent. Samples were collected at selected times during a 55-hour test period, and the results indicate the substantial similarity in operation and efficiency between the two stills.

TABLE I

| Still No. 1, without open surface cell nodules, amounts collected in ml. | Still No. 2, without open surface cell nodules, amounts collected in ml. | Distillates collected during given hours | High and low temperatures during collection in degrees (F.) | |
|---|---|---|---|---|
| 780 | 782 | 5 | 82 | 66 |
| 3,420 | 2,980 | 20 | 81 | 63 |
| 700 | 715 | 6 | 69 | 62 |
| 2,860 | 2,740 | 17 | 69 | 50 |
| 970 | 1,130 | 7 | 68 | 57 |

Table II below presents the results of evaporative distillations conducted simultaneously in one still containing no evaporation enhancing agent and in a companion still containing a monolayer of ceramic cellular nodules of this invention having a diameter of from about ⅓ to ¾ inch. The results indicate that the still containing the nodules delivered from about 50 to about 400 percent more distillate than the still containing no evaporation enhancing agent.

TABLE II

| Still No. 1, with nodules, distillate given in ml. | Still No. 2, without nodules distillate given in ml. | Distillates collected during given hours | High and low temperatures during collection in degrees (F.) | |
|---|---|---|---|---|
| 3,510 | 2,400 | 8:00 a.m.–8:00 a.m. | 79 | 52 |
| 2,170 | 480 | 9:00 a.m.–4:00 p.m. | 78 | 62 |
| 2,575 | 835 | 4:00 p.m.–8:00 a.m. | 76 | 64 |
| 270 | 70 | 8:00 a.m.–4:00 p.m. | 50 | 44 |
| 490 | 110 | 8:00 a.m.–4:00 p.m. | 58 | 53 |

In a third series of distillations the second series described above was duplicated except that the monolayer of nodules was placed in that still which contained no evaporation enhancing agent in test No. 2 and the still which had contained the nodules in test No. 2 was operated simultaneously with no evaporation enhancing agent present. The results of that distillation, presented in Table III below, indicate that the solar still containing the nodules of this invention delivered approximately from 100 to approximately 500 percent more distillate than the solar still not containing the evaporation enhancing agent.

TABLE III

| Still No. 1, without nodules, distillate given in ml. | Still No. 2, with nodules, distillate given in ml. | Distillates collected during given hours | High and low temperatures during collection in degrees (F.) | |
|---|---|---|---|---|
| 510 | 2,030 | 8:00 a.m.–4:00 p.m. | 72 | 49 |
| 260 | 740 | 8:00 a.m. 4:00 p.m. | 58 | 56 |
| 610 | 1,910 | 8:00 a.m.–4:00 p.m. | 65 | 49 |
| 420 | 980 | 9:00 a.m.–2:00 p.m. | 72 | 55 |
| 280 | 1,220 | 11:00 a.m.–5:00 p.m. | 72 | 58 |
| 620 | 2,240 | 8:00 a.m.–4:00 p.m. | 76 | 45 |
| 610 | 2,050 | 8:00 a.m.–4:00 p.m. | 78 | 48 |
| 210 | 1,340 | 8:00 a.m.–4:00 p.m. | 81 | 68 |
| 200 | 1,550 | 10:00 a.m.–5:00 p.m. | 65 | 52 |
| 410 | 2,150 | 9:00 a.m.–2:00 p.m. | 60 | 46 |

It is stated in the prior art that use of an evaporation enhancing agent comprising floating polymeric carbonaceous material and other carbonaceous materials increased evaporative distillation by approximately 20 to 40 percent. (See U.S. Pats. No. 3,282,327 and No. 3,279,527.) It can therefore be seen that use of the method and apparatus of this invention provides an improvement in evaporative distillation processes by a factor of several orders of magnitude.

This invention provides an improved method of liquid distillation employing a thin liquid film separated from and thermally insulated from a massive reservoir of such liquid by a plurality of substantially spherical cellular ceramic nodules having an irregular textured outer surface adapted to provide strong capillary and attractive surface forces, to provide maximum area for establishment of an enhanced evaporation zone, to provide continual replacement of evaporation liquid in the enhanced evaporation zone, and to optimize the consumption of thermal energy.

According to the provisions of the patent statutes, we have explained the principle, preferred construction and mode of operation of our invention and have illustrated and described what we now consider to represent its best embodiment.

What is claimed is:

1. A process for improving the evaporation rate of a liquid comprising,
   depositing a layer of cellular ceramic nodules on the upper free surface of a body of liquid in a manner that the cellular ceramic nodules float on the upper surface of said body of liquid with the upper portions of said cellular ceramic nodules exposed to solar heat,
   forming a relatively thin film of said liquid from said body of liquid on the upper exposed surfaces of said cellular ceramic nodules,
   insulating said thin film of liquid on the upper exposed surfaces of said cellular ceramic nodules by said cellular ceramic nodules positioned between said thin film of said liquid and said body of liquid,
   subjecting said thin film to elevated temperatures to vaporize the liquid in said thin film,
   condensing the vaporized liquid to form a condensate,
   collecting said condensate, and
   continuously replacing said liquid in said thin film from said body of said liquid.

2. A process for improving the evaporation rate of a liquid as set forth in claim 1 in which said cellular ceramic nodules float on said body of liquid so that major portions of said cellular ceramic nodules are above the upper free surface of said body of liquid,
   said cellular ceramic nodules having a thermal conductivity of between 0.40 and 0.50 b.t.u./hr. sq./ft./ ° F./in. at about 75° F.

3. A process for improving the evaporation rate of a liquid as set forth in claim 1 in which, said cellular ceramic nodules have a substantially spherical configuration and have a textured irregular outer surface, said cellular ceramic nodules having a diameter greater than 1/3 of an inch.

4. A process for improving the evaporation rate of a liquid as set forth in claim 3 in which, said cellular ceramic nodule outer surface is black.

5. A process for improving the evaporation rate of a liquid as set forth in claim 1 in which, said liquid is an aqueous salt solution.

6. A process for improving the evaporation rate of a liquid as set forth in claim 3 in which, said liquid is an aqueous salt solution, forming a salt residue on the exposed surface of said cellular ceramic nodules, and inverting said cellular ceramic nodules in said body of liquid to submerge said exposed surface of said cellular ceramic nodules to dissolve said salt residue in said aqueous solution.

7. A solar still for evaporating an aqueous salt solution with solar heat comprising, container means for a body of aqueous salt solution in which said aqueous salt solution has an exposed upper surface, a monolayer of cellular ceramic nodules floating on the upper exposed surface of said body of aqueous salt solution, covering means enclosing the upper portion of said container and arranged to permit passage of solar heat therethrough, said covering means including means on the interior surface thereof to condense the vaporized liquid from said aqueous salt solution, and collecting means for said condensate.

8. A solar still for evaporating an aqueous salt solution with solar heat as set forth in claim 7 in which, said adjacent nodules being in substantially contiguous relation with each other to thereby insulate said body of aqueous salt solution from solar heat passing through said covering means, and said cellular ceramic nodules being substantially spherical in shape and having an outer textured surface.

9. A process for improving the evaporation rate of a liquid as set forth in claim 1 in which, the rate of evaporation is increased between 50 and 500% over the rate of evaporation of said liquid without said layer of cellular ceramic nodules floating on the upper surface of said body of liquid.

10. A process for improving the evaporation rate of a liquid as set forth in claim 2 which includes, depositing a monolayer of substantially spherical cellular ceramic nodules having a diameter of between 1/3 and 3/4 of an inch on the upper free surface of said body of liquid, said cellular ceramic nodules having a thermal conductivity of 0.40 and 0.50 b.t.u./hr./sq. ft./°F./in at about 75° F. and a density of between 10 and 20 lbs. per cu. ft., said cellular ceramic nodules having a textured irregular outer surface.

References Cited
UNITED STATES PATENTS

| Number | Date | Name | Class |
|---|---|---|---|
| 3,699,006 | 10/1972 | Hasslacher | 203—11 |
| 3,122,594 | 2/1964 | Kielback | 261—94 |
| 3,302,372 | 2/1967 | Hynson et al. | 261—94 |
| 3,364,656 | 1/1968 | Whiton et al. | 261—94 |
| 3,409,279 | 11/1968 | Metrailer | 261—94 |
| 3,293,153 | 12/1966 | Lustenader | 203—89 |
| 3,493,218 | 2/1970 | Custellucci | 261—95 |
| 3,099,630 | 7/1963 | Wildi et al. | 203—10 |
| 3,138,546 | 6/1964 | Muller | 202—234 |
| 3,159,554 | 12/1964 | Mount | 202—234 |
| 3,220,934 | 11/1965 | Beredjick | 203—10 |
| 3,279,527 | 10/1966 | Hardy | 202—234 |
| 3,282,327 | 11/1966 | Hardy et al. | 202—234 |
| 3,290,231 | 12/1966 | Ries et al. | 203—10 |
| 3,361,186 | 1/1968 | Wildi et al. | 203—10 |
| 3,441,075 | 4/1969 | Wildi et al. | 203—10 |
| 3,442,769 | 5/1969 | Heinz | 203—10 |

WILBUR L. BASCOMB, JR., Primary Examiner

U.S. Cl. X.R.

203—Dig 1, 89, 100; 202—234, 236; 159—1 S; 261—95

UNITED STATES PATENT OFFICE
CERTIFICATE OF CORRECTION

Patent No. 3,801,474         Dated April 2, 1974

Inventor(s) Nicholas T. Castellucci and Ned C. Krouskop

It is certified that error appears in the above-identified patent and that said Letters Patent are hereby corrected as shown below:

| | |
|---|---|
| Column 2, Line 35 | After "typical" delete 'colar' and insert --solar-- |
| Column 2, Line 42 | After "thin" insert --liquid-- |
| Column 2, Line 46 | After "plurality" delete 'of' and insert --or-- |
| Column 7, Line 66 | After "It" delete 'clan' and insert --can-- |
| Claim 10, Line 2 | After "claim" delete '2' and insert --1-- |

Signed and Sealed this fourth Day of November 1975

[SEAL]

Attest:

RUTH C. MASON
Attesting Officer

C. MARSHALL DANN
Commissioner of Patents and Trademarks